(12) United States Patent
Jiang

(10) Patent No.: US 10,871,652 B2
(45) Date of Patent: Dec. 22, 2020

(54) VISION AID DEVICE

(71) Applicant: BRILLIMEDICAL INTERNATIONAL CORPORATION, Glen Cove, NY (US)

(72) Inventor: Haotian Jiang, Glen Cove, NY (US)

(73) Assignee: BRILLIMEDICAL INTERNATIONAL CORPORATION, Glen Cove, NY (US)

( * ) Notice: Subject to any disclaimer, the term of this patent is extended or adjusted under 35 U.S.C. 154(b) by 95 days.

(21) Appl. No.: 16/347,148

(22) PCT Filed: Nov. 3, 2017

(86) PCT No.: PCT/US2017/059923
§ 371 (c)(1),
(2) Date: May 2, 2019

(87) PCT Pub. No.: WO2018/093588
PCT Pub. Date: May 24, 2018

(65) Prior Publication Data
US 2020/0057305 A1 Feb. 20, 2020

Related U.S. Application Data

(60) Provisional application No. 62/417,062, filed on Nov. 3, 2016.

(51) Int. Cl.
*G02B 27/01* (2006.01)
*G02B 27/28* (2006.01)
*G02B 27/02* (2006.01)
*G02B 5/30* (2006.01)

(52) U.S. Cl.
CPC ....... *G02B 27/0172* (2013.01); *G02B 5/3083* (2013.01); *G02B 27/027* (2013.01);
(Continued)

(58) Field of Classification Search
CPC .............. G02B 5/3083; G02B 27/0172; G02B 27/0176; G02B 27/283; G02B 2027/0138; G02B 2027/0178
(Continued)

(56) References Cited

U.S. PATENT DOCUMENTS 5,777,715 A   7/1998   Kruegle et al.
5,886,822 A * 3/1999   Spitzer ............... G02B 27/0172
                                                         359/630
(Continued)

FOREIGN PATENT DOCUMENTS

EP          0821257        1/1998
KR        20090053316      5/2009
WO         2016052134      4/2016

OTHER PUBLICATIONS

International Search Report issued for International Patent Application No. PCT/US2017/059923, dated Jun. 8, 2018, 3 pages.
(Continued)

*Primary Examiner* — Ricky D Shafer
(74) *Attorney, Agent, or Firm* — Hamre, Schumann, Mueller & Larson, P.C.

(57) ABSTRACT

A wearable device that aids vision of a person is disclosed that includes a display system including a display device, a first polarizer parallel to the display device, a quarter waveplate, and a mirror. The display device, the first polarizer, the quarter waveplate, and the mirror are arranged sequentially such that the display device is disposed at a first end of the display system and the mirror is disposed at a second, opposite end of the display system. The display system has a length corresponding to a focal length of the mirror. A camera system includes a camera and an image stabilization system with a zoom magnification configured to provide up to at or about 60 times zoom. The display system and the
(Continued)

camera system are secured to a mount and are movable relative to each other about the mount. The mount is secured to a frame.

20 Claims, 7 Drawing Sheets

(52) U.S. Cl.
CPC .... *G02B 27/283* (2013.01); *G02B 2027/0123* (2013.01); *G02B 2027/0138* (2013.01); *G02B 2027/0178* (2013.01)

(58) Field of Classification Search
USPC ...... 359/489.07, 489.08, 630, 631, 633, 900
See application file for complete search history.

(56) References Cited

U.S. PATENT DOCUMENTS

| | | | | |
|---|---|---|---|---|
| 6,091,546 | A * | 7/2000 | Spitzer | G02B 27/017 359/618 |
| 6,204,974 | B1 * | 3/2001 | Spitzer | G02B 27/017 359/630 |
| 6,879,443 | B2 * | 4/2005 | Spitzer | G02B 27/0081 345/8 |
| 7,158,096 | B1 * | 1/2007 | Spitzer | G02B 27/0172 345/8 |
| 2013/0021658 | A1 | 1/2013 | Miao et al. | |
| 2013/0044042 | A1 | 2/2013 | Olsson et al. | |
| 2013/0088413 | A1 * | 4/2013 | Raffle | G09G 3/003 345/7 |
| 2015/0070596 | A1 | 3/2015 | Gadjali | |
| 2016/0018639 | A1 | 1/2016 | Spitzer et al. | |
| 2016/0091722 | A1 | 3/2016 | Liu et al. | |
| 2016/0161740 | A1 | 6/2016 | Bar-Zeev et al. | |

OTHER PUBLICATIONS

Extended European Search Report issued for European Patent Application No. 17871198.2, dated Jun. 12, 2020, 12 pages.

* cited by examiner

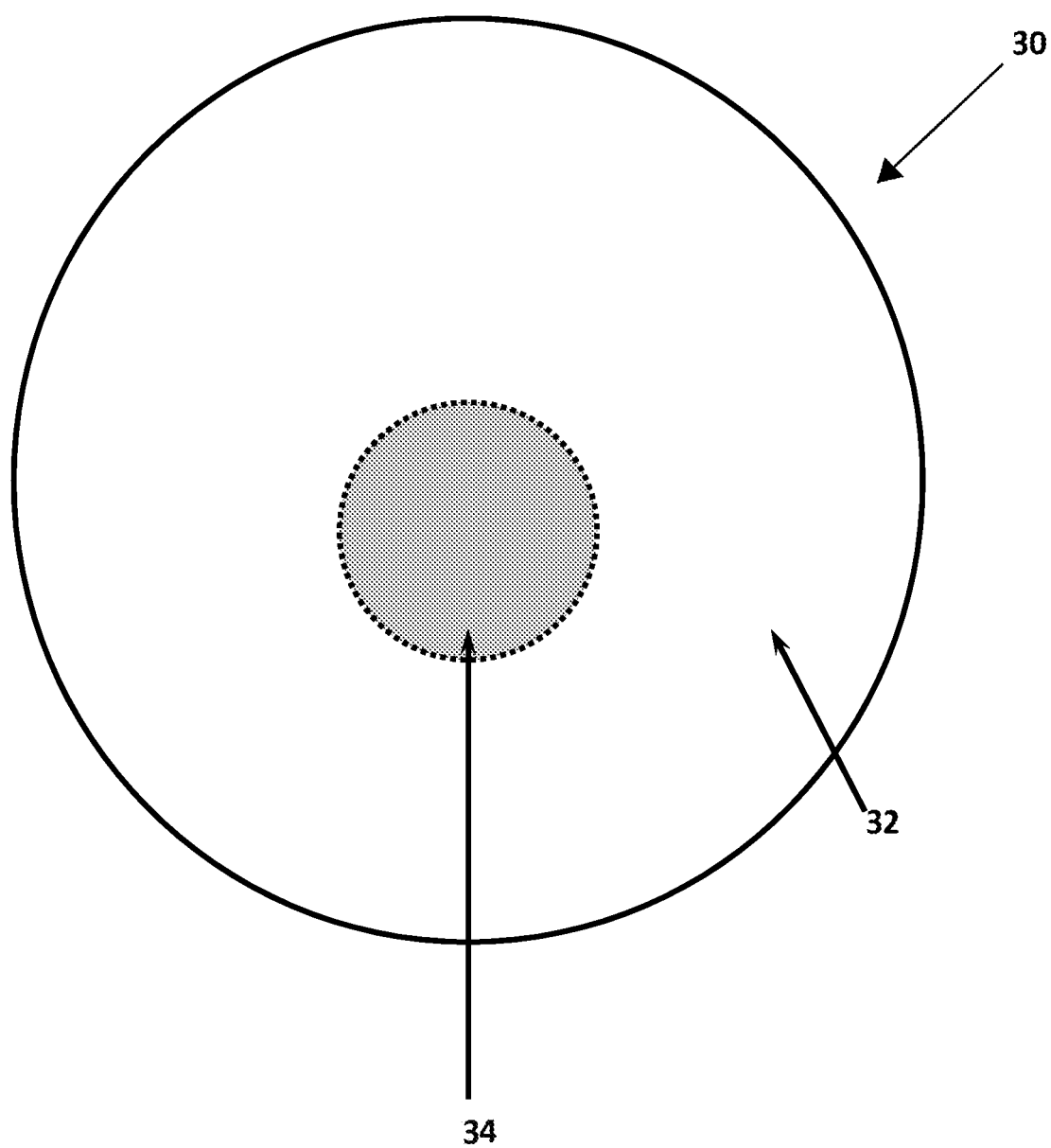

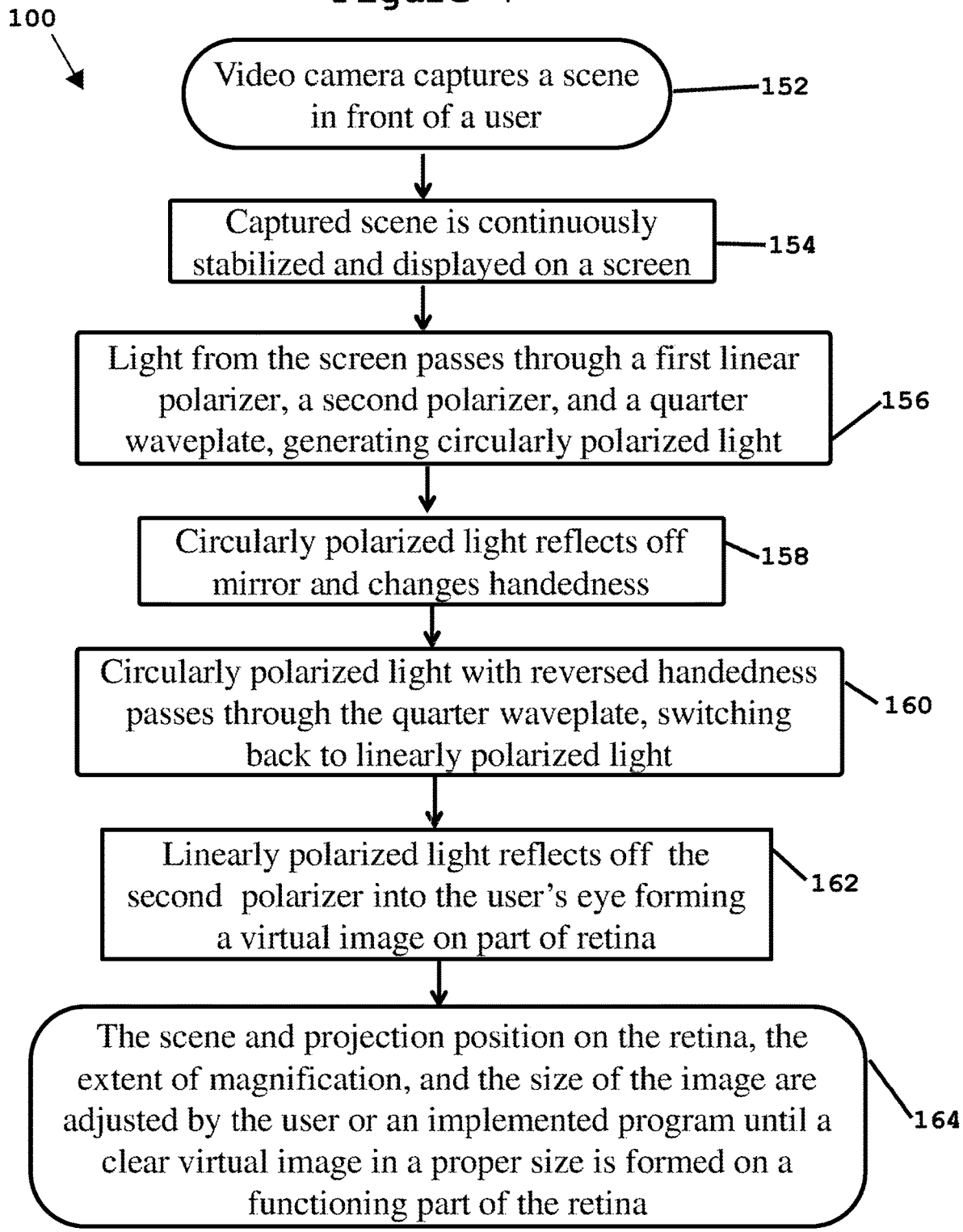

VISION AID DEVICE

FIELD

This disclosure is directed to a device for aiding vision of a person. More specifically, the disclosure is directed to a wearable device for aiding vision of a person such as, but not limited to, a person suffering from a degenerative vision medical condition.

BACKGROUND

Macular degeneration is a common medical condition, especially among elderly people. A person suffering from macular degeneration generally has a damaged or malfunctioning retina, particularly the macula of the retina. The macula generally has the sharpest resolution of the eye. Generally, the damaged or malfunctioning macula may not properly respond to light in a front of the person. As a result, the person may have blurred or no vision in a region at or about a center of a field of vision. Macular degeneration may limit a person's ability to recognize faces, drive, read, or the like. The deterioration of the macula may expand outwards from the central part of the retina. However, it is unlikely to affect a peripheral region of the retina.

SUMMARY

This disclosure is directed to a device for aiding vision of a person. More specifically, the disclosure is directed to a wearable device for aiding vision of a person such as a person suffering from a degenerative vision medical condition.

In an embodiment, the device is a head-wearable device. In an embodiment, the head-wearable device can be a glasses device. In an embodiment, the head-wearable device can be a hat, headband, or the like.

In an embodiment, the wearable device includes a camera system, a display device, a display system, a transparent enclosure for the display system, a mount, a first sliding enclosure (x-axis) capable of adjusting the position between the camera system and the display system, and a second sliding enclosure (y-axis) capable of adjusting the distance between the display system and an eye of a person wearing the device.

In an embodiment, the wearable device further includes a controller capable of outputting at least one command. In an embodiment, the command is used to control one or more of a color scheme, brightness, and contrast of the display screen. In an embodiment, the controller is capable of receiving an input from one or more buttons. In an embodiment, the controller can be a wired or a wireless controller. The controls can also be performed using buttons on the wearable device. In an embodiment, the controls are buttons on a printed circuit board (PCB) for controlling the wearable device.

In an embodiment, the first or the second sliding enclosure can be adjusted either manually or automatically.

In an embodiment, the device further includes a power switch for the display device and the camera.

A wearable device that aids vision of a person is disclosed. The wearable device includes a display system including a display device, a first polarizer parallel to the display device, a quarter waveplate, and a mirror, wherein the display device, the first polarizer, the quarter waveplate, and the mirror are arranged sequentially such that the display device is disposed at a first end of the display system and the mirror is disposed at a second, opposite end of the display system. The display system has a length corresponding to a focal length of the mirror. A camera system includes a camera and an image stabilization system. The camera includes a zoom magnification configured to provide up to at or about 60 times zoom. A mount is included. The display system and the camera system are secured to the mount. The display system and the camera system are movable relative to each other about the mount. The mount is secured to a frame.

A head-wearable device that aids vision of a person is also disclosed. The head-wearable device includes a display system including a display device, a first polarizer parallel to the display device, a second polarizer disposed at a 45° angle relative to the display device, a quarter waveplate, and a mirror, wherein the display device, the first polarizer, the second polarizer, the quarter waveplate, and the mirror are arranged sequentially such that the display device is disposed at a first end of the display system and the mirror is disposed at a second, opposite end of the display system. The display system has a length corresponding to a focal length of the mirror. A camera system includes a camera and an image stabilization system, the camera including a zoom magnification configured to provide up to at or about 60 times zoom. The display system and the camera system are secured to the mount. The display system and the camera system are movable relative to each other about the mount. The mount is secured to a frame.

A method to aid vision of a person with a visual degeneration medical condition is also disclosed. The method includes installing a wearable device in the person's field of view. A scene is captured in front of the person with a camera. The scene as captured is stabilized. The scene as stabilized is displayed on a display system of the wearable device. Displaying on the display system includes passing light through the first linear polarizer, the second linear polarizer, and the quarter waveplate to form circularly polarized light; reflecting the circularly polarized light off the mirror; passing the reflected circularly polarized light through the quarter waveplate and reflecting on the second polarizer to pass into the person's eye, thereby forming a virtual image on part of the retina.

BRIEF DESCRIPTION OF THE DRAWINGS

References are made to the accompanying drawings that form a part of this disclosure, and which illustrate embodiments in which the systems and methods described can be practiced.

FIG. 1A shows a normal field of view of a person, according to an embodiment.

FIG. 1B shows a field of view of a person having a degenerative vision medical condition, according to an embodiment.

FIG. 1C shows a field of view of the person having the degenerative vision medical condition from FIG. 1B wearing a wearable device for aiding vision of a person, according to an embodiment.

FIG. 2 is a schematic diagram of a retina of a person having a degenerative vision medical condition, according to an embodiment.

FIG. 7 is a flowchart of a method to operate a wearable device for aiding the vision of a person, according to an embodiment.

Like reference numbers represent like parts throughout.

DETAILED DESCRIPTION

Figure 3:
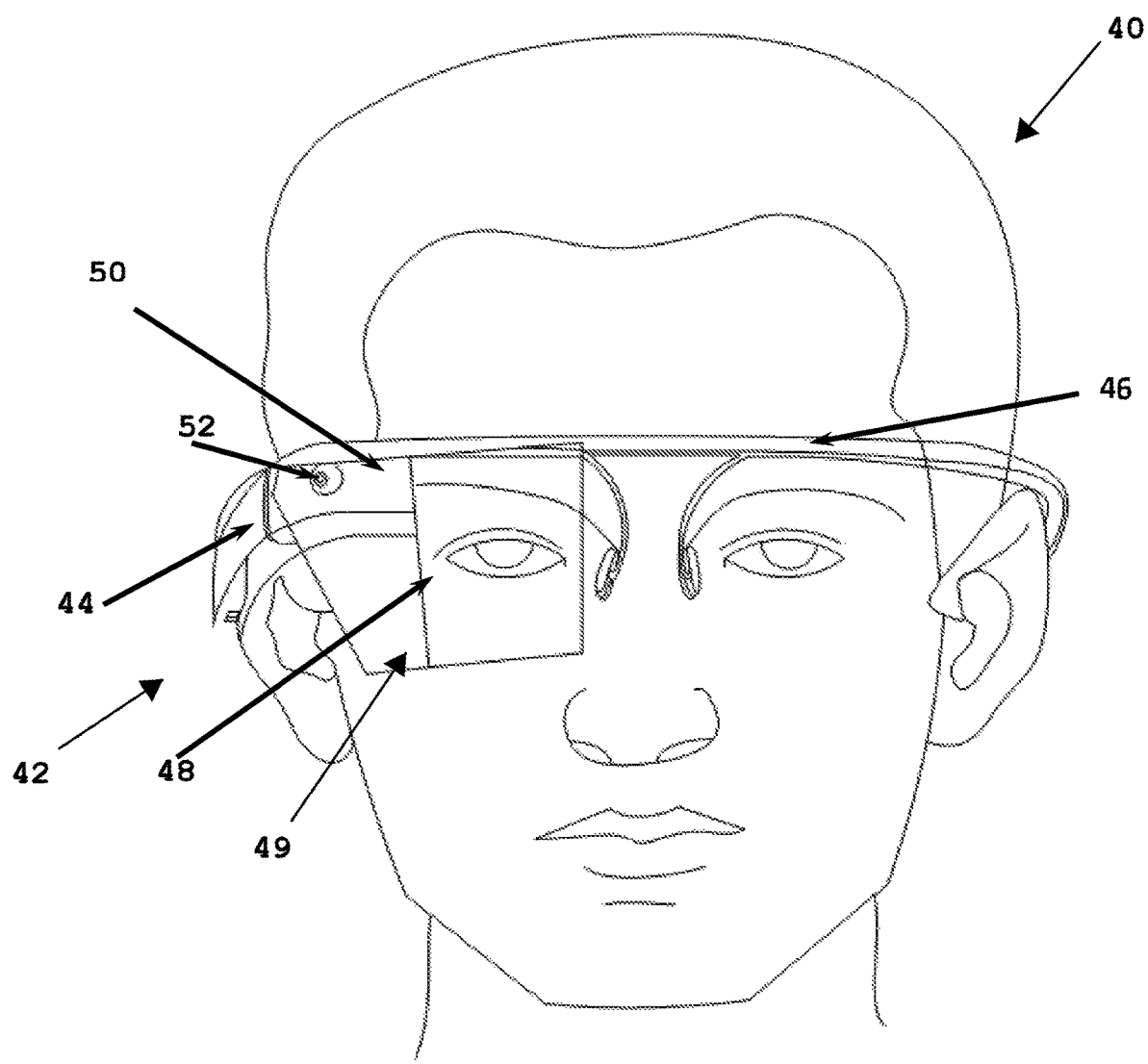
FIG. 3 is a schematic diagram of a wearable device for aiding vision of a person, according to an embodiment.

This disclosure is directed to a device for aiding vision of a person. More specifically, the disclosure is directed to a wearable device for aiding vision of a person such as a person suffering from a degenerative vision medical condition.

People suffering from a degenerative vision medical condition such as, but not limited to, macular degeneration, may have blurred or no vision in particular areas of their vision.

Macular degeneration is a common medical condition, especially among elderly people. A person suffering from macular degeneration generally has a damaged or malfunctioning retina, particularly the macula of the retina. The macula generally has the sharpest resolution of the eye. Generally, the damaged or malfunctioning macula may not properly respond to light in a front of the person. As a result, the person may have blurred or no vision in a region at or about a center of a field of vision. Macular degeneration may limit a person's ability to recognize faces, drive, read, or the like. The deterioration of the macula may expand outwards from the central part of the retina. However, it is unlikely to affect a peripheral region of the retina. In cases where a person's peripheral region of the retina is unaffected, the person's vision may be enhanced with an external device.

Currently, devices for aiding the vision of a person having macular degeneration may reflect light via a display screen into the person's eye. However, these devices generally require an enclosed space for optical efficiency and contrast, similar to a virtual reality headset. As a result, the vision aid devices are generally bulky in both size and appearance. Devices for aiding the vision of a person which are smaller in size are desirable.

Embodiments of this disclosure are directed to a wearable device that can capture and magnify a scene that would normally be formed at the malfunctioning macular region. The captured and magnified scene can then be projected in a well-functioning region of the retina (e.g., a peripheral region outside of a center of the field of view, etc.). In an embodiment, magnification may be used to compensate for limitations of the retina outside of the macula.

In an embodiment, the wearable device for aiding vision of a person can utilize a polarization projection method. In an embodiment, using polarization-implemented augmented reality may enable a reduction in size of the wearable device. In an embodiment, the reduction in size can, for example, result in a minimalistic design having a relatively better aesthetic appearance in comparison to a conventional reflection system.

FIGS. 1A-1C are schematic diagrams that illustrate a normal field of view 10 of a person, a field of view 16 of a person having a degenerative vision medical condition, and a field of view 18 of the person having the degenerative vision medical condition when using a wearable device for aiding vision of the person, according to an embodiment.

FIG. 1A shows the normal field of view 10 of a person, according to an embodiment. Within the normal field of view 10 are a plurality of letters 12. It will be appreciated that the letters 12 are shown as an example, and that the field of view 10 could alternatively include images other than letters. The normal field of view 10 includes a central region 14 that is illustrated in dashed lines. The central region 14 indicates an area in which the person's macula would identify the letters 12. For simplicity of this specification, the normal field of view 10 does not include variations in resolution across the various regions of a person's retina.

FIG. 1B shows the field of view 16 of a person having a degenerative vision medical condition, according to an embodiment. The degenerative vision medical condition can be representative of macular degeneration. In the field of view 16, a central region 14A is shown in place of the central region 14 (FIG. 1A) that does not include any of the letters 12. Instead, the central region 14A is shown as being blocked (e.g., blurred, etc.) to represent the blind spot of the person having the degenerative vision medical condition due to the malfunctioning macula.

FIG. 1C shows the field of view 18 of the person having the degenerative vision medical condition from FIG. 1B wearing a wearable device for aiding vision of a person, according to an embodiment. Similar to FIG. 1B, the central region 14A is shown without any of the letters 12 that are visible in the central region 14 (FIG. 1A) of the normal field of view 10. However, the letters 12 that were illustrated in the central region 14 of the normal field of view 10 are shown in a region 20 as a virtual image which is displayed within the field of view 18. The region 20 includes the same letters M, N, W, X, and Y as displayed in the central region 14 of the normal field of view 10. The letters can be captured by a camera of the wearable device for aiding the vision of the person and projected in a region outside of the macula (e.g., a functioning region of the retina) for the person to view. The wearable device for aiding the vision of the person is described in additional detail below. In the illustrated embodiment, the region 20 is shown in an upper right corner of the field of view 18. It will be appreciated that the region 20 can alternatively be displayed in other areas of the field of view 18 which are outside of the malfunctioning macula region, according to the principles of this disclosure.

FIG. 2 is a schematic diagram of a retina 30 of a person having a degenerative vision medical condition, according to an embodiment. It will be appreciated that the degenerative vision medical condition in the illustrated embodiment is generally representative of macular degeneration. As such, the retina 30 is representative of a retina from a person having a malfunctioning or damaged macula. The retina 30 includes a functioning region 32 and a malfunctioning region 34. The functioning region 32 of the retina 30 is generally located at a peripheral region of the retina 30 that surrounds the malfunctioning region 34. The malfunctioning region 34 of the retina 30 is generally located at or about a center of the retina 30. It will be appreciated that the retina 30 including the functioning region 32 and the malfunctioning region 34 are intended as an example, and that the relative size and shape of the functioning region 32 and the malfunctioning region 34 can vary according to the person.

FIG. 3 is a schematic diagram of a person 40 wearing a wearable device 42 for aiding vision of the person 40, according to an embodiment.

The wearable device 42 in the illustrated embodiment is in a form of glasses that can be worn by the person 40. The wearable device 42 includes a mount 44, a frame 46, a display system 48, and a camera system 50. In an embodiment, the display system 48 can alternatively be referred to as the optical component 48. In an embodiment, the camera system 50 can alternatively be referred to as the camera component 50. The camera system 50 includes a camera 52.

The display system 48 includes an enclosure 49. In an embodiment, the enclosure 49 can be optical glass, a transparent material such as a polymer, combinations thereof, or the like. In an embodiment, the enclosure 49 can be a polycarbonate or the like. Because the enclosure 49 is transparent, the person wearing the wearable device 42 can maintain his/her original vision in the eye using the polarization-implemented augmented reality. The projected image is "stacked" on top of his/her current vision. In an embodiment, the stacking of the projected image can make the person wearing the wearable device 42 more comfortable with a transition between his fields of view when putting on or taking off the wearable device 42. In an embodiment, relating the content in the virtual image displayed by the display system 48 with the wearer's peripheral vision, the wearer may be able to more easily locate a particular target. In an embodiment, using the polarization-implemented augmented reality may enable a reduction in size of the wearable device 42. Reducing the size of the wearable device 42 can, in an embodiment, result in a minimalistic design having a more pleasing aesthetic appearance relative to prior devices.

The mount 44 attaches the wearable device 42 to one side of a frame 46. The frame 46 can be similar to a frame for glasses, according to an embodiment. In an embodiment, the mount 44 can also be attached to the beam of a cap/hat or other head-wearable device such as, but not limited to, a headband or the like. An embodiment in which the wearable device 42 is attached to a hat is shown and described in accordance with FIG. 6 below.

Figure 4:
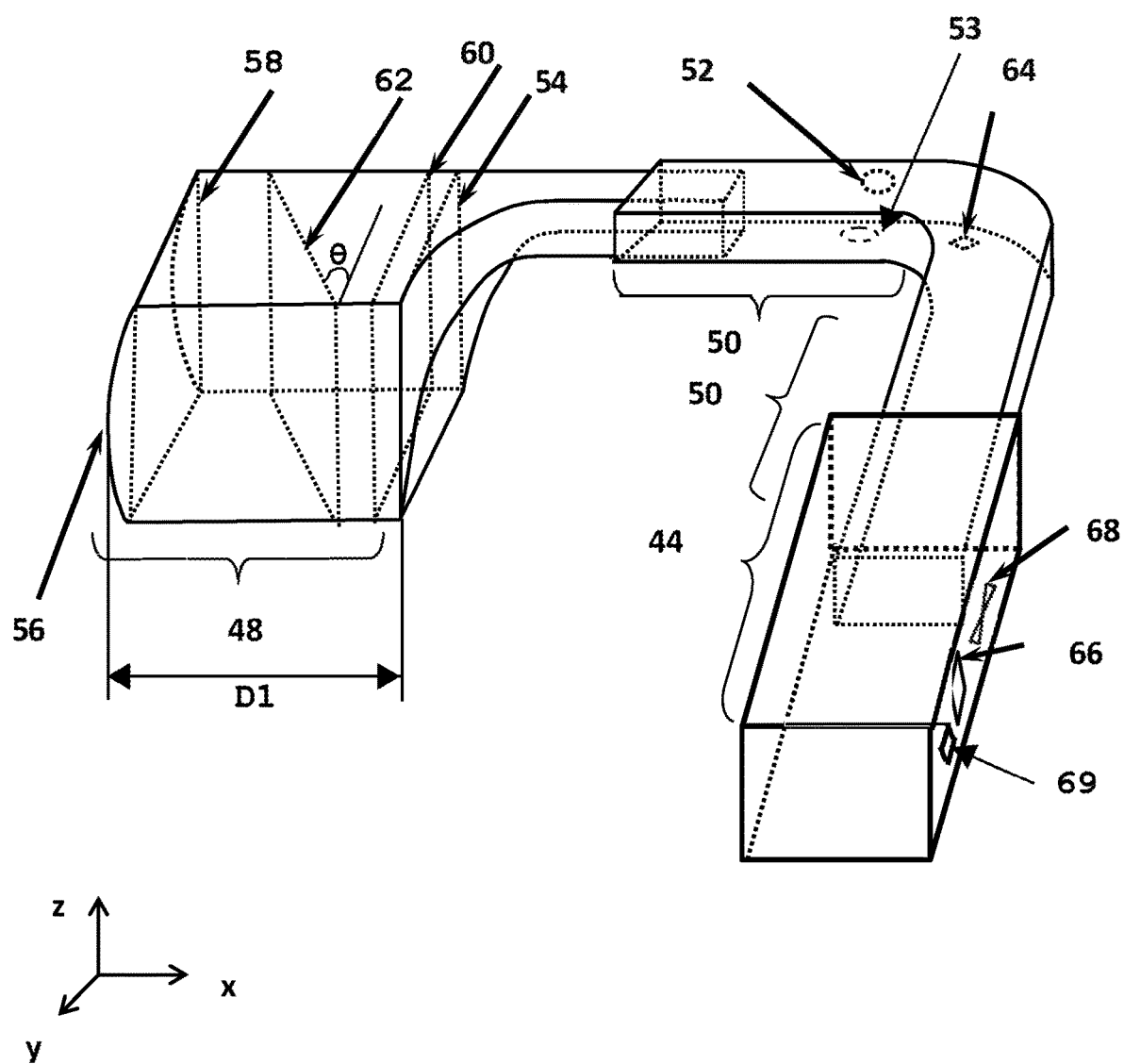
FIG. 4 is a schematic diagram of the wearable device for aiding the vision of the person of FIG. 3, according to an embodiment.

In an embodiment, the wearable device 42 may be adjustable to manipulate, for example, a location of the camera system 50, the display system 48, or a combination of the camera system 50 and the display system 48. An adjustment mechanism is realized by sliding the camera 52 within a hollow enclosure of the mount 44. In an embodiment, the sliding is designed with calculated tolerances, so that a relative position between the two components can be fixed and the sliding occurs when an external force exceeds a certain value (e.g., from the wearer's intentional adjustment as opposed to accidentally). The sliding can also be realized through flexures or screws translating into linear motion. In an embodiment, the sliding can be accomplished manually. In an embodiment, the sliding can be controlled electronically. In an embodiment including electronic control of the sliding motion, the wearable device 42 can include a retina scanner 53 (FIG. 4). The retina scanner 53 can be considered a part of the camera system 50, according to an embodiment. In use, the retina scanner 53 may be used to scan a retina of the wearer of the wearable device 42. Based on the scan of the retina of the wearer, the wearable device 42 may be electronically adjusted by sliding the adjustment mechanism.

In an embodiment, wearer 40 can easily adjust the relative position between the camera system 50 and the mount 44. In an embodiment, this adjustment mechanism can allow a y-axis adjustment up to at or about 10 millimeters. In an embodiment, the y-axis adjustment can be greater than at or about 10 millimeters. In an embodiment, the y-axis adjustment can be conducted either manually or automatically. In an embodiment, the y-axis adjustment can be manually completed by, for example, the wearer sliding the camera system 50 in the y-direction, or by manipulating an adjustment screw that moves the camera system 50 in the y-direction. In an embodiment, the wearer may be able to press an adjustment button that moves the camera system 50 in the y-direction. When the mount is attached to the beam of a cap (e.g., as shown and described in accordance with FIG. 6), adjustments along the y-axis may be free (e.g., greater than at or about 10 millimeters).

In an embodiment, the display system 48 incorporates another adjustment mechanism (in this case between the display system 48 and the camera system 50) to achieve adjustment of the projection area along the x-axis. In an embodiment, the x-axis adjustment can be up to at or about 8 millimeters. In an embodiment, the x-axis adjustment can be greater than at or about 8 millimeters. In an embodiment, the x-axis adjustment can be conducted either manually or automatically. In an embodiment, the x-axis adjustment can be manually completed by, for example, the wearer sliding the camera system 50 in the x-direction, or by manipulating an adjustment screw that moves the camera system 50 in the x-direction. In an embodiment, the wearer may be able to press an adjustment button that moves the camera system 50 in the x-direction. When the mount is attached to the beam of a cap (e.g., as shown and described in accordance with FIG. 6), adjustments along the x-axis may be free (e.g., greater than at or about 8 millimeters).

In an embodiment, the x-axis adjustment and y-axis adjustment can be conducted sequentially or simultaneously. In an embodiment, the virtual image reflected into the wearer's eye can be located in any peripheral part of the retina by utilizing the adjustment in the x-direction, the y-direction, or a combination thereof.

In an embodiment, the display system 48 and its components can be capable of producing a virtual image having a minimum apparent size of a 50-inch screen viewed from 2.5 meters away.

FIG. 4 is a schematic diagram of the wearable device 42 for aiding the vision of the person 40 of FIG. 3, according to an embodiment.

The wearable device 42 includes the display system 48, display device 54, camera device 50, and the mount 44. The display system 48 includes a mirror 56, a wave plate 58, a first polarizer 60, and a second polarizer 62.

The wearable device 42 includes the display system 48 and an image stabilization system 64. A bigger image can be achieved to enable the application as a vision aid. A display device 54 connected to a camera system 50 on the wearable device 42 can be used to project an image. The display system 48 includes the mirror 56 separated from the display device 54 by a distance D1 so that light reflected from the mirror 56 will be collimated. In an embodiment, the distance D1 is at or about the same as a focal length of the mirror 56. In an embodiment, the display system 48 can be referred to as a modified polarizing beam splitter.

In an embodiment, two polarizers 60, 62 are placed between the display device 54 and the mirror 56. In an embodiment, the first polarizer 60 is parallel to the display device 54. It will be appreciated that the first polarizer 50 may be substantially parallel to the display device 54 subject to, for example, manufacturing tolerances and variations. In an embodiment, the second polarizer 62 is disposed at an angle θ relative to the display device 54. In the illustrated embodiment, the angle θ is at or about 45° relative to the display device 54. The second polarizer 62 can redirect light reflected from the mirror 56 into the wearer's eye, thus forming a virtual screen. In another embodiment, a single polarizer (e.g., polarizer 60) can be disposed between the display device 54 and the mirror 56. The single polarizer 60 can form the angle θ of 45° to the display device 54.

The wearer can adjust the zoom magnification of the camera 52. The zoom magnification can be accomplished using the magnification-adjustment buttons 68. The magnification may be dependent on each wearer's particular vision condition. Accordingly, the magnification-adjustment buttons 68 can help compensate for either the decreased resolution in an area of the retina other than the macula or blurry macular vision from, for example, cataracts, diabetic retinopathy, or the like.

In an embodiment, the zoom magnification can range from at or about 2 to at or about 60 times. In an embodiment, the zoom magnification can range from at or about 5 to at or about 10 times. When using 2-time zoom, for example, an object takes up about 4 times as many pixels as the same object under 1-time zoom. In an embodiment, the display device 54 has at least at or about 8 times zoom.

Magnifying the projected scene (e.g., the region 20 in FIG. 1C) may limit a field of view displayed on the display device 54. Accordingly, a minor movement from the wearer's head position can cause a large shift in the projected scene. Stabilization in the capturing process is therefore desired.

In an embodiment, when a user reaches an extent of a zoom of the camera 52, the user may be able to digitally zoom on the display device 54. In an embodiment, the zooming may be controlled using the magnification-adjustment buttons 68. In an embodiment, a separate zoom button 69 may be used to digitally zoom on the display device 54. In an embodiment that includes the zoom button 69, a user may zoom with either the magnification-adjustment buttons 68 or the zoom button 69. In an embodiment that does not include the zoom button 69, the digital zooming of the display may occur automatically when the user has adjusted the zoom to the extent of the camera 52.

In an embodiment, an image stabilization system 64 can be included in the wearable device 42. For example, in an embodiment, an image stabilizer can be built into a processor of the camera 52 to account for involuntary shaking or vibration from the wearer's head. In an embodiment, the image stabilizer can be a mechanical image stabilizer (e.g., a sensor-shifting image stabilizer, etc.), or can be programmatically controlled to provide electronic image stabilization. In an embodiment, the image stabilizer can have both a mechanical component and a programmatic component. The captured scene feeds into the display device 54.

In an embodiment, the display device 54 can be an organic light emitting diode (OLED) display, a ferroelectric liquid crystal on silicon (FLCOS) display, or the like. In an embodiment, if a resolution is sufficient, the display device 54 can be a light emitting diode (LED) display, a liquid crystal display (LCD), or the like.

In an embodiment, the mirror 56 can be toroidal or parabolic in shape. In an embodiment, the mirror 56 can be concave with a concave lens immediately adjacent to the mirror 56. In an embodiment, the mirror 56 can be a convex lens with a reflective coating on one end. In such an embodiment, the convex lens with a reflective coating can achieve a same refractive power and reflection by fitting a concave lens to the reflectively coated convex lens.

The wearable device 42 can be switched on with a switch 66. In an embodiment, the switch 66 can include a physical switch. In an embodiment, the switch 66 can be controlled by a form of a proximity sensor. In an embodiment, the proximity sensor is an infrared sensor. In an embodiment, the switch 66 can include an infrared switch which can be toggled based on proximity of, for example, a person's finger. The switch 66 can be placed at one side of the mount 44. When switched on, the camera 52 starts to capture an image and/or record a scene in the blind spot 14A. The person can choose the desired scene by moving his/her head. The person can choose where the scene is projected in his/her field of view using the adjustment mechanism described above.

In an embodiment, the wearable device 42 can provide a virtual image with a relatively bigger size in comparison to currently available augmented reality wearable products. In an embodiment, the size of the virtual image has a minimum apparent size of a 50-inch screen viewed from 2 meters away. In an embodiment, the adjustment can be controlled via a remote.

In an embodiment, optical components and their housings are proportionally increased so that the final projected image fits the ideal dimension, which can be experimentally determined.

In another embodiment, the wearable device 42 is designed and configured by attaching a telescope to the camera 52 or switching the camera 52 with one that has optical zoom, so that the scene is already magnified before projection, and then adding another optical component behind the prism, so that the projected image can be larger.

In an embodiment, the display system 48 has a length approximate to the focal length of the mirror 56.

In an embodiment, another piece of glass can be mounted between the display system 48 and the eye of the person wearing the wearable device 42 for a person who is either far-sighted or near-sighted.

Figure 5:
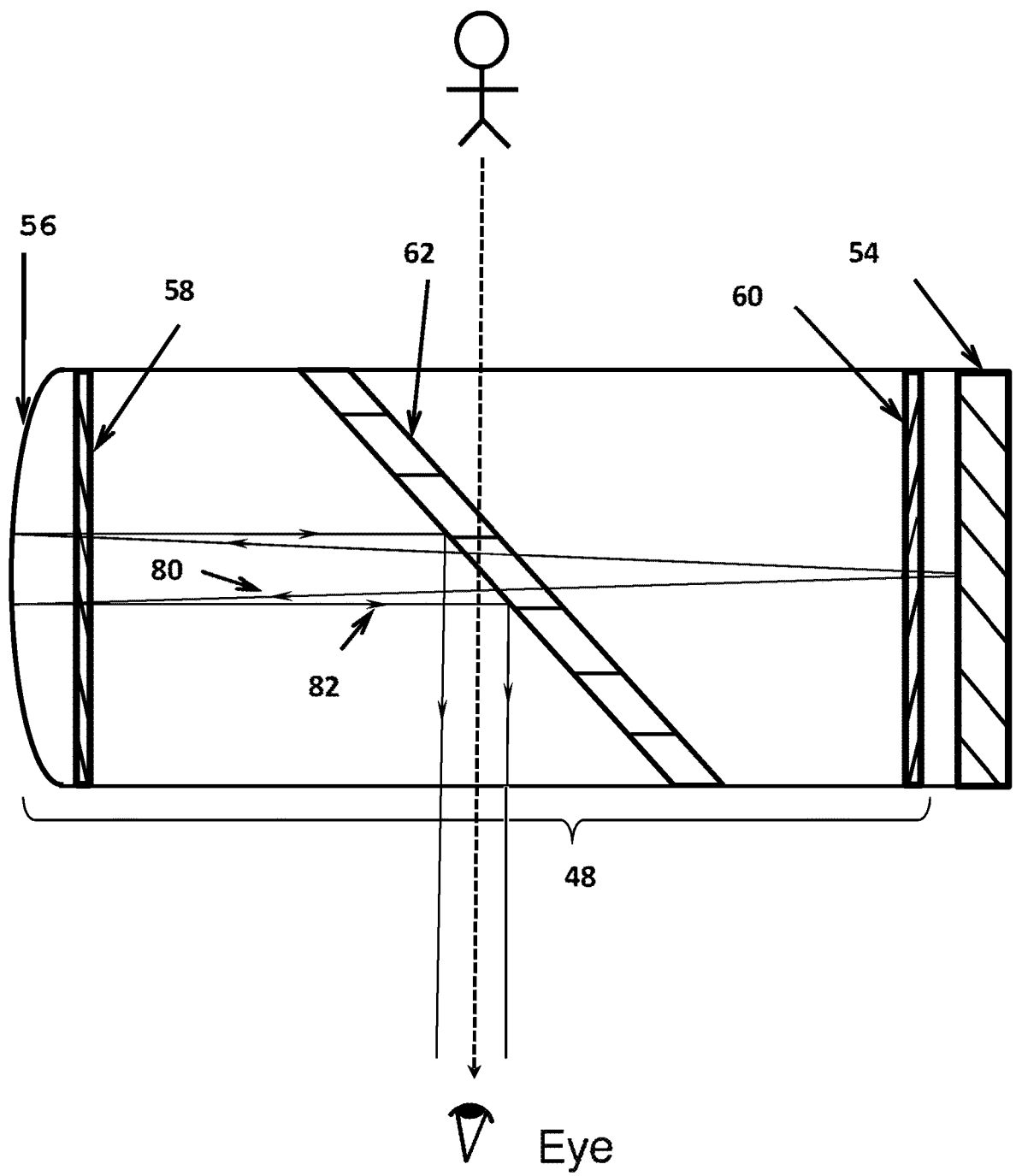
FIG. 5 is a schematic diagram of a top view of an optical component and light path from a display of the wearable device for aiding the vision of the person, according to an embodiment.

FIG. 5 is a schematic diagram of a top view of the display system 48 and light path from the display 54 of the wearable device 42 for aiding the vision of the person, according to an embodiment.

On a forward propagation path 80, light from the display device 54 goes through the first linear polarizer 60 and becomes linearly polarized. The second linear polarizer 62 is angled 45° relative to the first linear polarizer 60. The linearly polarized light, for example s-polarized, goes through the quarter waveplate 58, becoming circularly polarized. The circularly polarized light then reflects on the mirror 56, and becomes collimated. Upon reflection, the collimated and circularly polarized light changes handedness. On its path back from the mirror 56, the collimated and circularly polarized light 82 re-passes through the quarter waveplate 58, and changes to a polarization orthogonal to that of the forward propagation path 80, for example p-polarized. The collimated light, upon reaching the first linear polarizer 60 will be reflected into the wearer's eye. Due to the nature of human vision, the eye perceives the incoming collimated light as coming from infinity (e.g., a ray from a top of an object to the eye is approximately parallel to the ground).

Figure 6:
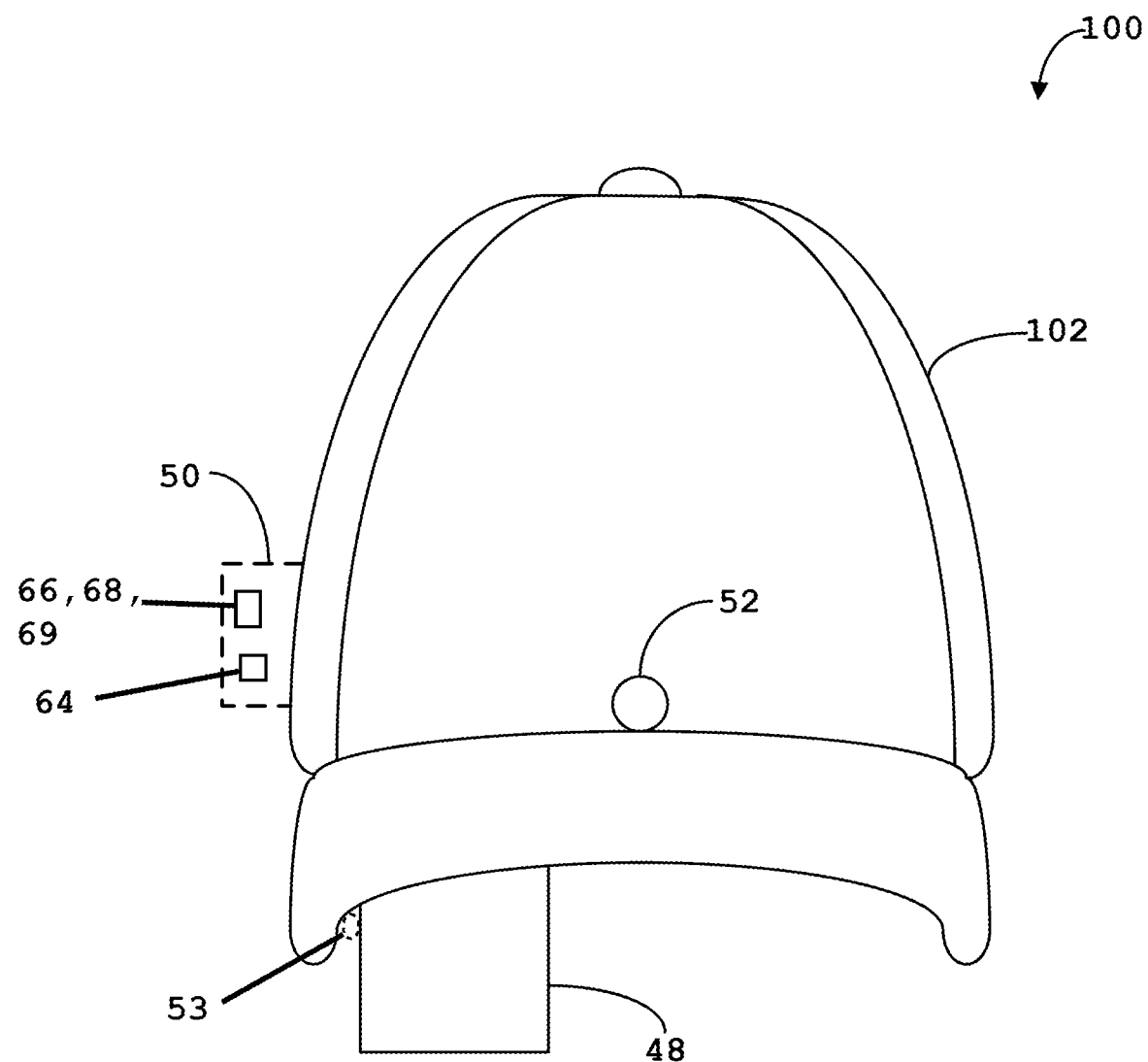
FIG. 6 is a schematic diagram of a wearable device for aiding vision of a person, according to another embodiment.

FIG. 6 is a schematic diagram of a wearable device 100 for aiding vision of a person, according to another embodiment. The wearable device 100 is a head-wearable device. In particular, the head-wearable device is a hat that can be worn on a head of the person. The wearable device 100 is shown with a cap/hat 102. It will be appreciated that the wearable device 100 can include the components other than the hat 102, but be securable to a hat, according to an embodiment. Features of the wearable device 100 can be the same as or similar to features of the wearable device 42.

The wearable device 100 includes the hat 102, a display system 48, and a camera system 50. It will be appreciated that the wearable device 100 can include one or more other features. For example, the hat 102 may be adjustable via one or more snaps or other features, according to an embodiment. Adjustability of the hat 102 can generally be in accordance with known principles.

In operation, the wearer may be able to adjust a location of the display system 48 by adjusting the hat 102. For example, the wearer may be able to turn the hat 102 rightward or leftward to move a location of the display system 48 in a rightward of leftward direction with respect to the wearer's functioning retina (e.g., the functioning retina 32 in FIG. 2).

The display system 48 is shown in a particular location of the hat 102. It will be appreciated that the display system 48 can alternatively be moved to an opposite side (e.g., a right side in the figure) of the hat 102. In an embodiment, the display system 48 may be movable by the wearer. For example, the display system 48 may be removably secured to a particular location of the hat 102 so that the wearer may move the display system 48 to a desired location. In another embodiment, the display system 48 may be fixed. In such an embodiment, the wearer may be able to adjust a location of the display system 48 by adjusting the hat 102.

The camera 52 is shown in about a center location of the hat 102. It will be appreciated that the camera 52 can be moved. For example, the camera 52 can be moved relatively up or down on the hat 102. In an embodiment, the camera 52 can be moved leftward or rightward on the hat 102. In an embodiment, the camera 52 may be removably secured to the hat 102 so that the wearer can remove the camera 52 and point it toward a selected object. The camera system 50 is shown at a particular location of the hat 102. It will be appreciated that the camera system 50 can be moved to a different location of the hat 102. In an embodiment, features illustrated in FIGS. 3 and 4, but not shown in FIG. 6, may also be included in the embodiment of FIG. 6.

It will be appreciated that the relative size and location of the display system 48 and the camera system 50 in FIGS. 3 and 6 may be variable, according to an embodiment. The illustrations are intended as examples and not intended to be limiting.

FIG. 7 is a flowchart of a method 150 to operate a wearable device for aiding the vision of a person, according to an embodiment. The method 150 can generally be used to operate the wearable device 42 (FIG. 3) or the wearable device 100 (FIG. 6) to aid the vision of the person.

The method 150 begins at 152 with capturing a scene in front of the wearer of the wearable device 42 using a camera (e.g., the camera 52 in FIG. 4). At 154 the scene captured at 152 is stabilized (e.g., with image stabilizing processor 64 in FIG. 3) and displayed on a display (e.g., the display 54 of the wearable device 42 in FIG. 4) for the wearer of the wearable device 42.

At 156, light from the display device 54 sequentially passes through a linear polarizer (e.g., first linear polarizer 60 in FIG. 4), a second linear polarizer (e.g., second linear polarizer 62 in FIG. 4), and a quarter waveplate (e.g., waveplate 58 in FIG. 4) to form circularly polarized light. In an embodiment, there may be a single linear polarizer. In such an embodiment, the second linear polarizer would not be present and the light would pass from the first linear polarizer to the quarter waveplate.

At 158, the circularly polarized light reflects off a mirror (e.g., mirror 56 in FIG. 4) and changes handedness. At 160, the circularly polarized light with reversed handedness passes through the quarter waveplate, switching back to linearly polarized light. At 162, the linearly polarized light reflects on the second linear polarizer and enters the patient's eye forming a virtual image on part of a retina (e.g., the functioning part 32 in FIG. 2). In an embodiment with the single linear polarizer, the linearly polarized light would reflect on the first linear polarizer and enter the patient's eye, forming a virtual image on part of the retina.

At 164, the scene and projection position on the retina, magnification, and the size of the image are adjusted by the person or an implemented program, until a clear virtual image in a proper size is formed on the functioning part of the retina. In an embodiment, 164 can include electronically controlling an adjustment in an x-direction and y-direction of the display system 48 via sliding motion (e.g., using mount 44 in FIG. 4). In such an embodiment, 164 can include scanning a retina of the wearer of the wearable device 42 using a retina scanner 53 (FIG. 4). Based on the scan of the retina of the wearer, the wearable device 42 may be electronically adjusted by sliding the adjustment mechanism.

Aspects:

It is to be appreciated that any one of aspects 1-9 can be combined with any one of aspects 10, 11-19, 20, 21-32, 33-38, and 39-40. Aspect 10 can be combined with any one of aspects 1-19, 20, 21-32, 33-38, and 39-40. Any one of aspects 11-19 can be combined with any one of aspects 20, 21-32, 33-38, and 39-40. Any one of aspects 21-32 can be combined with any one of aspects 33-38 and 39-40. Any one of aspects 33-38 can be combined with any one of aspects 39-40.

Aspect 1. A vision aid device for a patient with macular degeneration without causing any dizziness or with minimal dizziness, comprising: a camera component; a display screen; an optical component; a power switch; a mount; and a magnification control, wherein the camera component consists of a camera with zoom and an image stabilization system, the optical component includes a first polarizer parallel to the display screen and a second polarizer angled at 45° to the display screen, a quarter waveplate, and a mirror, the optical component has a length approximate to the focal length of the mirror, the camera component is connected to the optical component via a first sliding enclosure, the camera component is connected to the mount via a second sliding enclosure, and the power switch and the magnification control are fixed on any side of the mount.

Aspect 2. The vision aid device according to aspect 1, wherein either the first polarizer or the second polarizer is a polarizing beam-splitter.

Aspect 3. The vision aid device according to aspect 1 or 2, further comprising another controller capable of outputting or receiving at least one command through a wired or wireless approach.

Aspect 4. The vision aid device according to any of aspects 1-3, wherein the first sliding enclosure can be adjusted up to 8 mm.

Aspect 5. The vision aid device according to any of aspects 1-4, wherein the second sliding enclosure can be adjusted up to 10 mm.

Aspect 6. The vision aid device according to aspect 3, wherein the command is used to control color scheme, brightness, and contrast.

Aspect 7. The vision aid device according to any of aspects 1-6, wherein the power switch can be controlled by a proximity sensor.

Aspect 8. The vision aid device according to aspect 7, wherein the proximity sensor is an infrared sensor.

Aspect 9. The vision aid device according to any of aspects 1-8, wherein the magnification control and the camera can magnify from 2 to 20 times.

Aspect 10. A method for improving the vision of a patient with macular degeneration, comprising: installing the device according to aspect 1 in front of the patient's eye, wherein a scene in front of the patient is captured by a camera, stabilized, and then displayed on a screen; light from the screen sequentially passes through a first linear polarizer, a second linear polarizer, and a quarter waveplate to form circularly polarized light; the circularly polarized light reflects off a mirror, re-passes through the quarter waveplate, reflects on the second polarizer and enters the patient's eye, forming a virtual image on part of the retina; and the scene and projection position on the retina, the extent of magnification, and the size of the image are adjusted by the patient or an implemented program, until a clear image in a proper size is formed on a functioning part of the retina.

Aspect 11. A vision aid device for a patient with macular degeneration, without causing dizziness or with minimal dizziness, comprising a camera component; a display screen; an optical component; a power switch; a mount; and a magnification control, wherein the camera component consists of a camera with zoom and an image stabilization system; the optical component comprises only one polarizer angled at 45 degrees to the display screen, a quarter waveplate, and a mirror; the optical component has a length approximate to the focal length of the mirror; the camera component is connected to the optical component via a first sliding enclosure; the camera component is connected to the mount via a second sliding enclosure; and the power switch and the magnification control are fixed on any side of the mount.

Aspect 12. The vision aid device according to aspect 11, wherein the polarizer is a polarizing beam-splitter.

Aspect 13. The vision aid device according to aspect 11 or aspect 12, further comprising another controller capable of outputting or receiving at least one command through a wired or a wireless approach.

Aspect 14. The vision aid device according to one of aspects 11-13, wherein the first sliding enclosure can be adjusted up to 8 mm.

Aspect 15. The vision aid device according to one of aspects 11-14, wherein the second sliding enclosure can be adjusted up to 10 mm.

Aspect 16. The vision aid device according to aspect 13, wherein the command is used to control color scheme, brightness, and contrast.

Aspect 17. The vision aid device according to one of aspects 11-16, wherein the power switch can be controlled by a proximity sensor.

Aspect 18. The vision aid device according to aspect 17, wherein the proximity sensor is an infrared sensor.

Aspect 19. The vision aid device according to one of aspects 11-18, wherein the magnification control can magnify from 2 to 20 times.

Aspect 20. A method for improving the vision of a patient with macular degeneration, comprising installing the device of claim 11 in front of the patient's eye in need thereof, wherein a scene in front of the patient is captured by a camera, stabilized, and then displayed on a screen; light from the screen sequentially passes through a linear polarizer, and a quarter waveplate to form circularly polarized light; the circularly polarized light reflects off a mirror, re-passes through the quarter waveplate, reflects on the polarizer and enters the patient's eye forming a virtual image on part of the retina; and the scene and projection position on the retina, the extent of magnification, and the size of the image are adjusted by the patient or an implemented program, until a clear virtual image in a proper size is formed on a functioning part of the retina.

Aspect 21. A wearable device that aids vision of a person, comprising: a display system including a display device, a first polarizer parallel to the display device, a quarter waveplate, and a mirror, wherein the display device, the first polarizer, the quarter waveplate, and the mirror are arranged sequentially such that the display device is disposed at a first end of the display system and the mirror is disposed at a second, opposite end of the display system, the display system having a length corresponding to a focal length of the mirror; a camera system including a camera and an image stabilization system, the camera including a zoom magnification configured to provide up to at or about 60 times zoom; a mount, the display system and the camera system being secured to the mount, wherein the display system and the camera system are movable relative to each other about the mount; and a frame, the mount being secured to the frame.

Aspect 22. The wearable device according to aspect 21, wherein the wearable device is a head-wearable device that is wearable on a head of the person.

Aspect 23. The wearable device according to aspect 22, wherein the frame is a hat.

Aspect 24. The wearable device according to aspect 22, wherein the frame is a glasses type frame.

Aspect 25. The wearable device according to one of aspects 21-24, wherein the display system further comprises a second polarizer, the second polarizer being disposed between the first polarizer and the quarter waveplate, the second polarizer being angled at an angle of at or about 45° relative to the display device.

Aspect 26. The wearable device according to aspect 25, wherein one of the first polarizer and the second polarizer is a polarizing beam-splitter.

Aspect 27. The wearable device according to one of aspects 21-26, wherein the display device is a display screen.

Aspect 28. The wearable device according to one of aspects 21-27, wherein the display system is transparent.

Aspect 29. The wearable device according to one of aspects 21-28, further comprising a controller having a magnification control and a power switch.

Aspect 30. The wearable device according to aspect 29, wherein the power switch is one of a physical switch and a proximity sensor, the proximity sensor being an infrared sensor.

Aspect 31. The wearable device according to one of aspects 21-30, wherein the display system and the camera system are adjustable in an x-direction and a y-direction.

Aspect 32. The wearable device according to aspect 31, wherein the x-direction is adjustable up to at or about 8 mm and the y-direction is adjustable up to at or about 10 mm.

Aspect 33. A head-wearable device that aids vision of a person, comprising: a display system including a display device, a first polarizer parallel to the display device, a second polarizer disposed at a 45° angle relative to the display device, a quarter waveplate, and a mirror, wherein the display device, the first polarizer, the second polarizer, the quarter waveplate, and the mirror are arranged sequentially such that the display device is disposed at a first end of the display system and the mirror is disposed at a second, opposite end of the display system, the display system having a length corresponding to a focal length of the mirror; a camera system including a camera and an image stabilization system, the camera including a zoom magnification configured to provide up to at or about 60 times zoom; a mount, the display system and the camera system being secured to the mount, wherein the display system and the camera system are movable relative to each other about the mount; and a frame, the mount being secured to the frame.

Aspect 34. The head-wearable device according to aspect 33, wherein the frame is a hat.

Aspect 35. The head-wearable device according to one of aspects 33 or 34, wherein the frame is a glasses type frame.

Aspect 36. The head-wearable device according to one of aspects 33-35, wherein one of the first polarizer and the second polarizer is a polarizing beam-splitter.

Aspect 37. The head-wearable device according to one of aspects 33-36, wherein the display device is a display screen and is one of an organic light emitting diode (OLED) display and a ferroelectric liquid crystal on silicon (FLCOS) display.

Aspect 38. The head-wearable device according to one of aspects 33-37, wherein the display system and the camera system are adjustable in an x-direction and a y-direction.

Aspect 39. A method to aid vision of a person with a visual degeneration medical condition, comprising: installing a wearable device according to aspect 21 in the person's field of view; capturing a scene in front of the person with a camera; stabilizing the scene as captured; displaying the scene as stabilized on a display system of the wearable device, wherein the displaying includes: passing light through the first linear polarizer, the second linear polarizer, and the quarter waveplate to form circularly polarized light; reflecting the circularly polarized light off the mirror; passing the reflected circularly polarized light through the quarter waveplate and reflecting on the second polarizer to pass into the person's eye, thereby forming a virtual image on part of the retina.

Aspect 40. The method according to aspect 39, wherein the scene and a projection position of the virtual image on the retina, an extent of magnification, and a size of the image are adjusted by the person or an implemented program, until a clear image in a proper size is formed on a functioning part of the retina.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A wearable device that aids vision of a person, comprising:
    a display system including a display device, a first polarizer parallel to the display device, a quarter waveplate, and a mirror, wherein the display device, the first polarizer, the quarter waveplate, and the mirror are arranged sequentially such that the display device is disposed at a first end of the display system and the mirror is disposed at a second, opposite end of the display system, the display system having a length corresponding to a focal length of the mirror;
    a camera system including a camera and an image stabilization system, the camera including a zoom magnification configured to provide up to at or about 60 times zoom;
    a mount, the display system and the camera system being secured to the mount, wherein the display system and the camera system are movable relative to each other about the mount, the mount including a hollow enclosure;
    first and second adjustment mechanisms, the first adjustment mechanism being such that the camera system is movable in a length direction of the mount within the enclosure, the second adjustment mechanism being such that the display system is movable in a direction perpendicular to the length direction of the mount; and
    a frame, the mount being secured to the frame.

2. The wearable device according to claim 1, wherein the wearable device is a head-wearable device that is wearable on a head of the person.

3. The wearable device according to claim 2, wherein the frame is one of a hat or a glasses type frame.

4. The wearable device according to claim 1, wherein the display system further comprises a second polarizer, the second polarizer being disposed between the first polarizer and the quarter waveplate, the second polarizer being angled at an angle of at or about 45° relative to the display device.

5. The wearable device according to claim 4, wherein the second polarizer includes two combined polarizing beam splitters.

6. The wearable device according to claim 1, wherein the display device is a display screen.

7. The wearable device according to claim 1, wherein the display system is transparent.

8. The wearable device according to claim 1, further comprising a magnification control and a power switch.

9. The wearable device according to claim 8, wherein the power switch is one of a physical switch and a proximity sensor, the proximity sensor being an infrared sensor.

10. The wearable device according to claim 1, wherein the display system and the camera system are adjustable in an x-direction and a y-direction, the length direction being the y-direction.

11. The wearable device according to claim 10, wherein the x-direction is adjustable up to at or about 8 mm and the y-direction is adjustable up to at or about 10 mm.

12. A method to aid vision of a person with a visual degeneration medical condition, comprising:
    installing a wearable device according to claim 1 in a person's field of view;
    capturing a scene in front of the person with the camera;
    stabilizing the scene as captured;
    displaying the scene as stabilized on the display system of the wearable device, wherein the displaying includes:
        passing light through the first linear polarizer, the second linear polarizer, and the quarter waveplate to form circularly polarized light;
        reflecting the circularly polarized light off the mirror;
        passing the reflected circularly polarized light through the quarter waveplate and reflecting on the second polarizer to pass into the person's eye, thereby forming a virtual image on part of a retina and filling the person's field of view.

13. The method according to claim 12, including adjusting the scene and a projection position of the virtual image on the retina, an extent of magnification, and a size of the image until a clear image in a proper size is formed on a functioning part of a retina.

14. The wearable device according to claim 1, further comprising a retina scanner, wherein the first and second adjustment mechanisms are actuatable based on a scan of the retina by the retina scanner.

15. A head-wearable device that aids vision of a person, comprising:
- a display system including a display device, a first polarizer parallel to the display device, a second polarizer disposed at a 45° angle relative to the display device, a quarter waveplate, and a mirror, wherein the display device, the first polarizer, the second polarizer, the quarter waveplate, and the mirror are arranged sequentially such that the display device is disposed at a first end of the display system and the mirror is disposed at a second, opposite end of the display system, the display system having a length corresponding to a focal length of the mirror;
- a camera system including a camera and an image stabilization system, the camera including a zoom magnification configured to provide up to at or about 60 times zoom;
- a mount, the display system and the camera system being secured to the mount, wherein the display system and the camera system are movable relative to each other about the mount, the mount including a hollow enclosure;
- first and second adjustment mechanisms, the first adjustment mechanism being such that the camera system is movable in a length direction of the mount within the enclosure to adjust a distance between the display system and an eye of the person wearing the head-wearable device, the second adjustment mechanism being such that the display system is moveable in a direction perpendicular to the length direction of the mount to adjust a position between the camera system and the display system; and
- a frame, the mount being secured to the frame.

16. The head-wearable device according to claim 15, wherein the frame is a hat.

17. The head-wearable device according to claim 15, wherein the frame is a glasses type frame.

18. The head-wearable device according to claim 15, wherein one of the first polarizer and the second polarizer is a polarizing beam-splitter.

19. The head-wearable device according to claim 15, wherein the display device is a display screen and is one of an organic light emitting diode (OLED) display, a ferroelectric liquid crystal on silicon (FLCOS) display, a light emitting diode (LED) display, and a liquid crystal display (LCD).

20. The head-wearable device according to claim 15, wherein the display system and the camera system are adjustable in an x-direction and a y-direction.

* * * * *